June 9, 1953 R. B. PRESSLER 2,641,271
FLUID PROPORTIONER
Filed Feb. 13, 1951 12 Sheets-Sheet 1

RALPH B. PRESSLER
INVENTOR.

BY Edmund W. E. Kamm
ATTORNEY

RALPH B. PRESSLER
*INVENTOR.*

BY Edmund W. E. Kamm
ATTORNEY

June 9, 1953  R. B. PRESSLER  2,641,271
FLUID PROPORTIONER
Filed Feb. 13, 1951  12 Sheets-Sheet 3

RALPH B. PRESSLER
INVENTOR.

BY Edmund W. C. Kamm
ATTORNEY

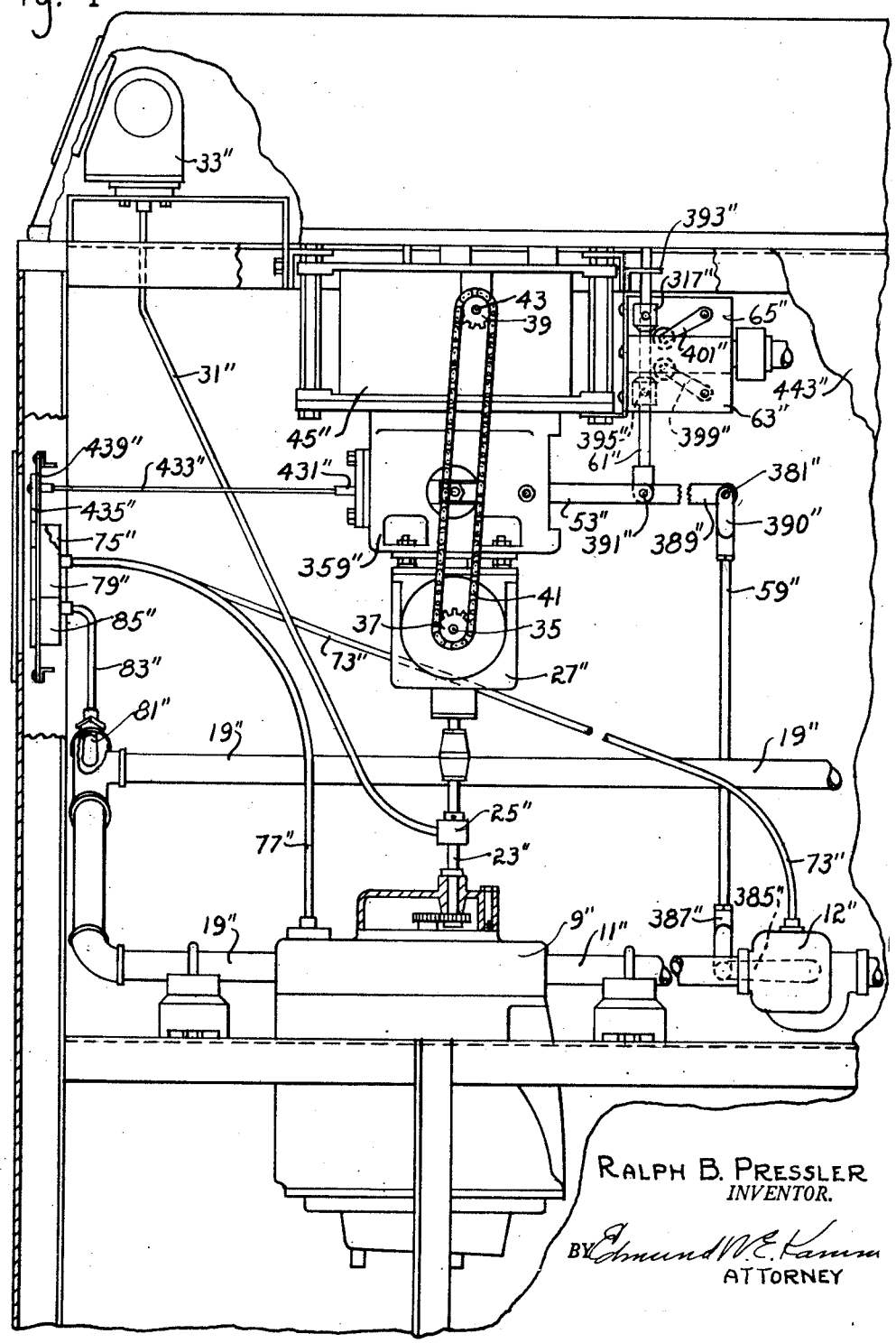

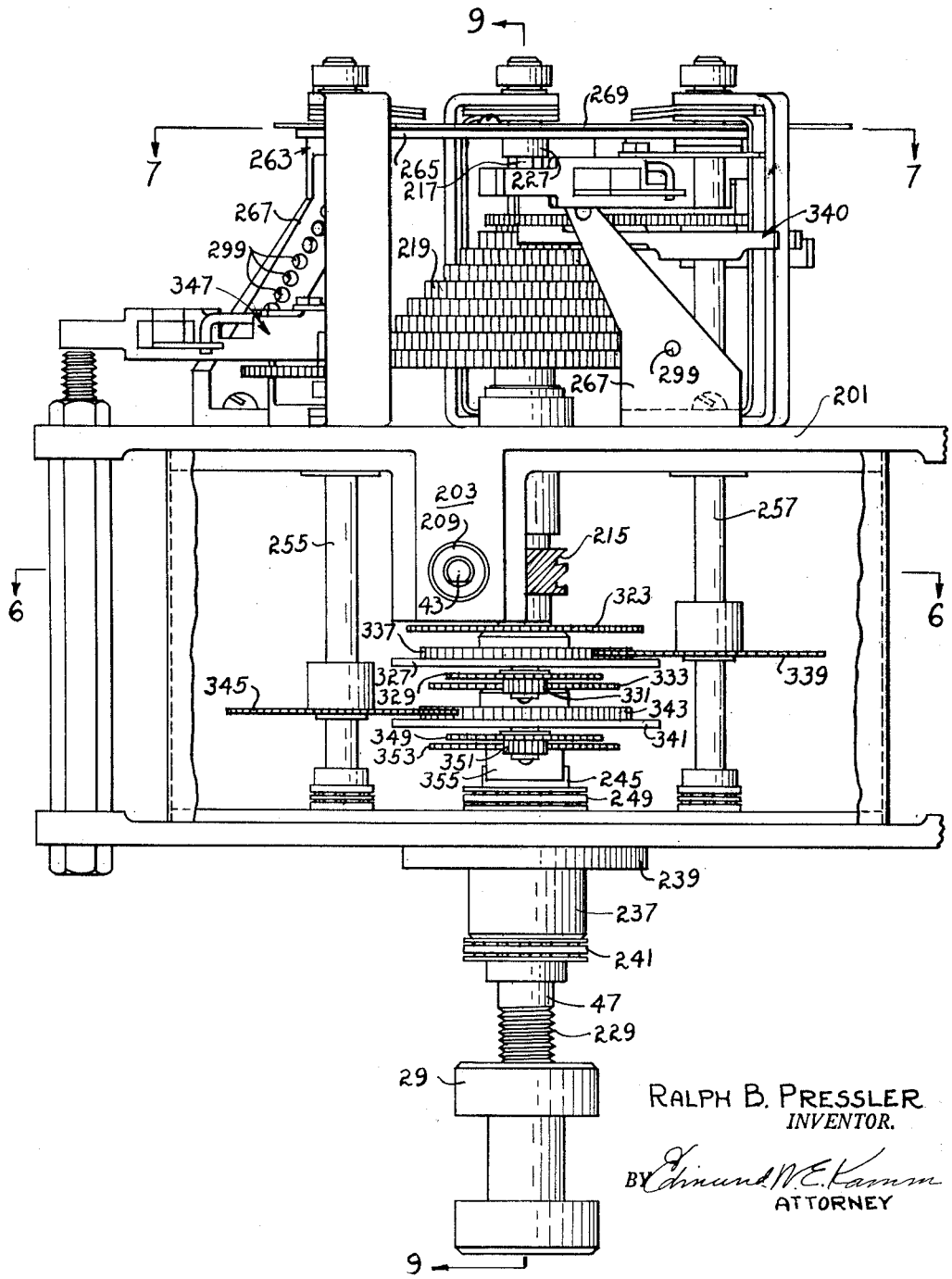

June 9, 1953   R. B. PRESSLER   2,641,271
FLUID PROPORTIONER
Filed Feb. 13, 1951   12 Sheets-Sheet 6
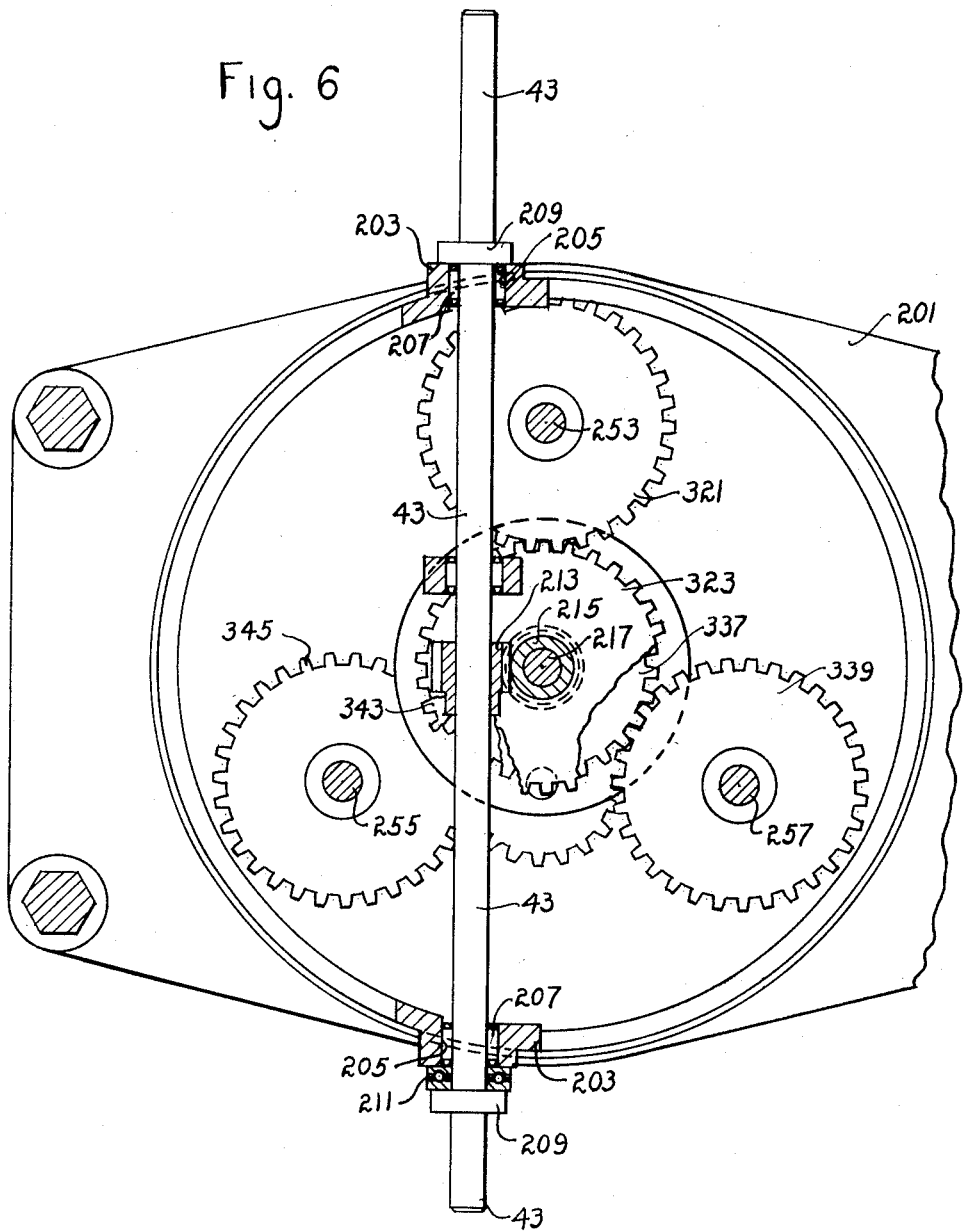
RALPH B. PRESSLER
INVENTOR.
BY Edmund W. E. Kamm
ATTORNEY

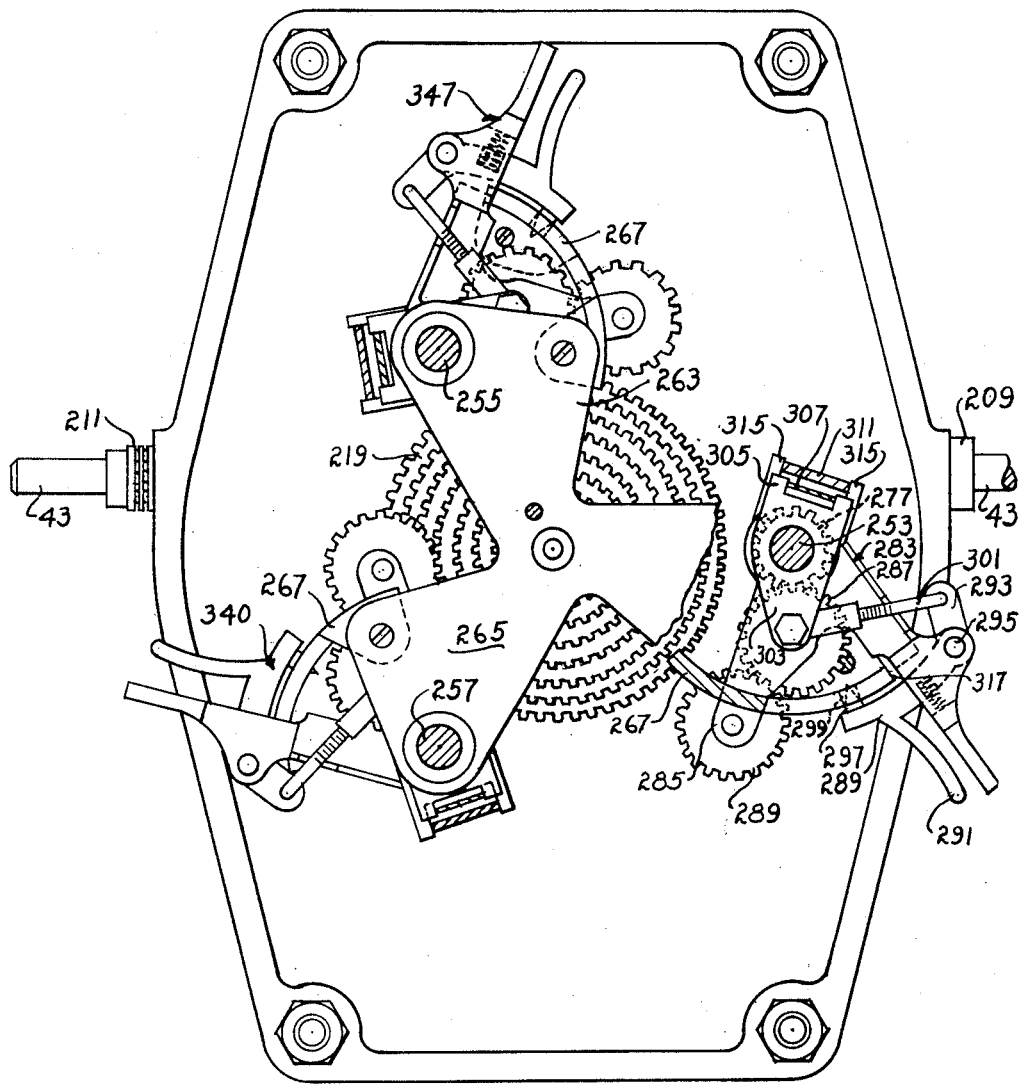

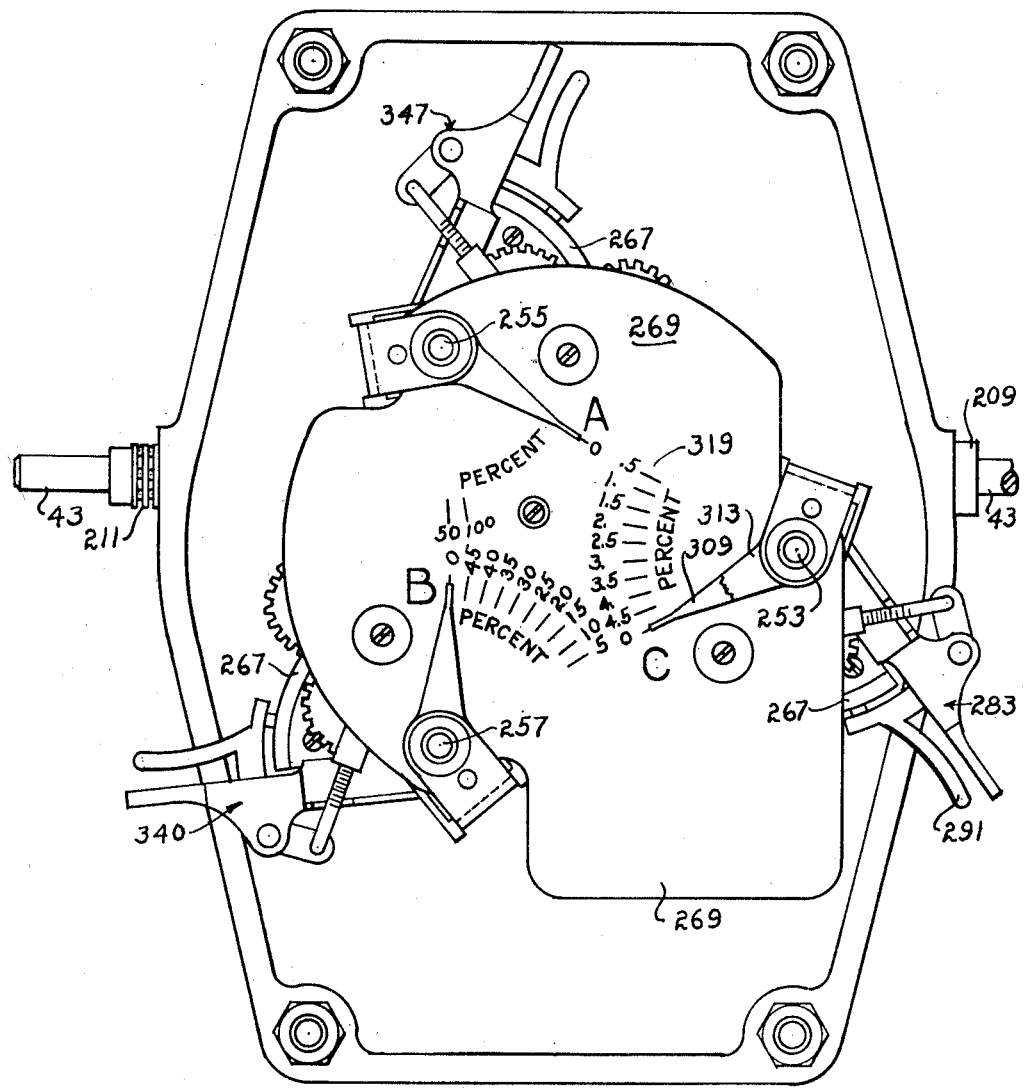

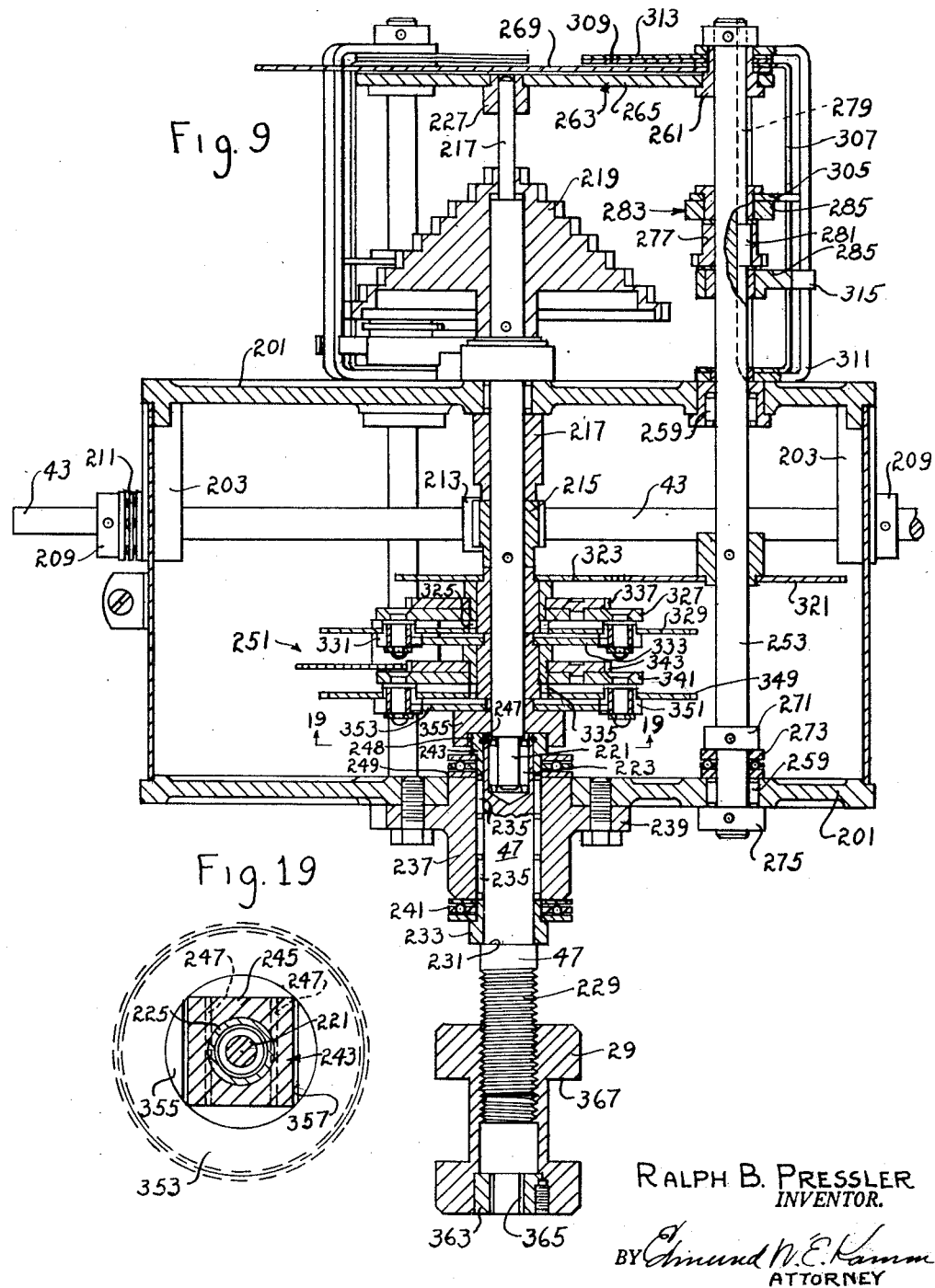

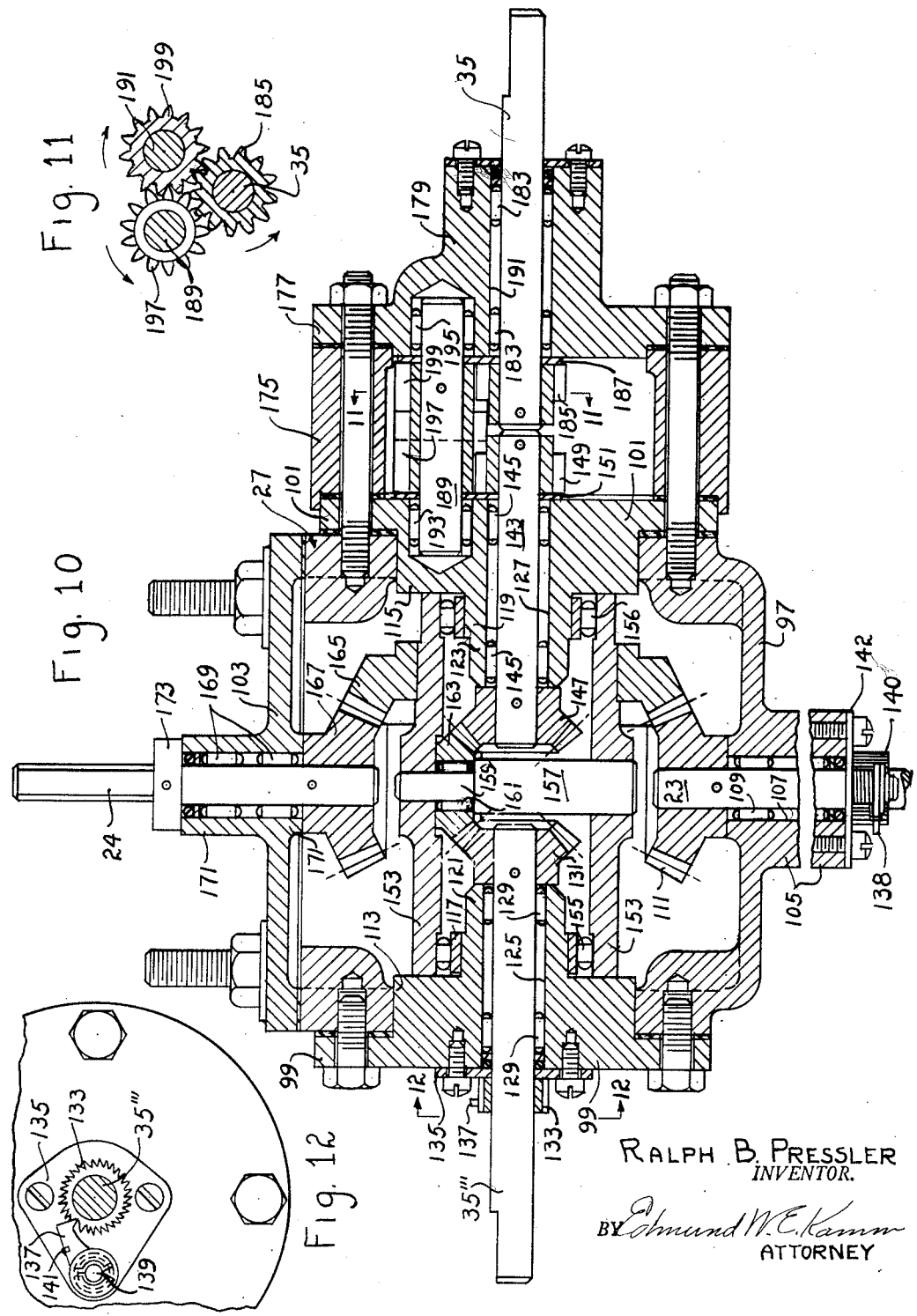

June 9, 1953

R. B. PRESSLER 2,641,271

FLUID PROPORTIONER

Filed Feb. 13, 1951

RALPH B. PRESSLER
*INVENTOR.*

BY Edmund W. E. Kamm
ATTORNEY

RALPH B. PRESSLER
INVENTOR.

BY Edmund W. E. Kamm
ATTORNEY

Patented June 9, 1953

2,641,271

UNITED STATES PATENT OFFICE 2,641,271

FLUID PROPORTIONER

Ralph B. Pressler, Fort Wayne, Ind., assignor to Bowser, Inc., Fort Wayne, Ind., a corporation of Indiana Application February 13, 1951, Serial No. 210,655

24 Claims. (Cl. 137—87)

This invention relates to a proportioner for fluids. More specifically, it relates to a mechanism to which a number of fluids may be supplied under pressure and which will mix said fluids in predetermined proportions, maintaining the proportions constant by adjusting the flow of all of the fluids as the supply of one or more of the fluids increases or decreases.

It is an object of the invention to provide a proportioner in which the speed standard is equal to the sum of the output speeds of all of the meters.

A further object of the invention is to provide a proportioner in which the speed standard varies with the speed of each of the meters.

Yet another object of the invention is to provide a proportioner in which the order of arrangement of the meters in the system is independent of the percentage of the total output which is being dispensed by such meter.

A further object of the invention is to provide a number of individual metering units which may be assembled into a proportioner in any order.

Yet another object of the invention is to provide means for registering the total volume of the liquid dispensed by each meter and the total volume of the liquid dispensed by all of the meters.

It is still another object of the invention to provide means for indicating when the percentage setting means are not properly engaged.

A further object of the invention is to provide means for indicating directly the percentage setting on each meter.

These and other objects will become apparent from a study of this specification and the drawings which are attached hereto and made a part hereof and in which:

Figure 4 is a side elevation of the apparatus of Figure 2 viewed from the right thereof.

Figure 5 is a front elevation of a variator unit.

Figure 6 is a sectional view taken substantially on the line 6—6 of Figure 5 showing the drive to the speed standard increment shaft.

Figure 7 is a sectional view taken substantially on line 7—7 of Figure 5 showing the percentage setting gearing and lever mechanism.

Figure 8 is a plan view of the variator unit of Figure 5 showing the percentage indicating mechanism.

Figure 9 is a vertical sectional view through the variator unit taken substantially on line 9—9 of Figure 5.

Figure 10 is a vertical sectional view showing the counterdrive and the speed standard compounding gearing.

Figure 11 is a sectional view taken on the line 11—11 of Figure 10 showing the reversing gearing.

Figure 12 is an elevation viewed substantially from the line 12—12 of Figure 10 showing the stop pawl and ratchet for preventing reverse rotation of the speed standard increment shaft.

Figure 19 is a sectional view taken substantially on the line 19—19 of Figure 9 showing the connection with the adjusting screw.

General construction

Figure 1:
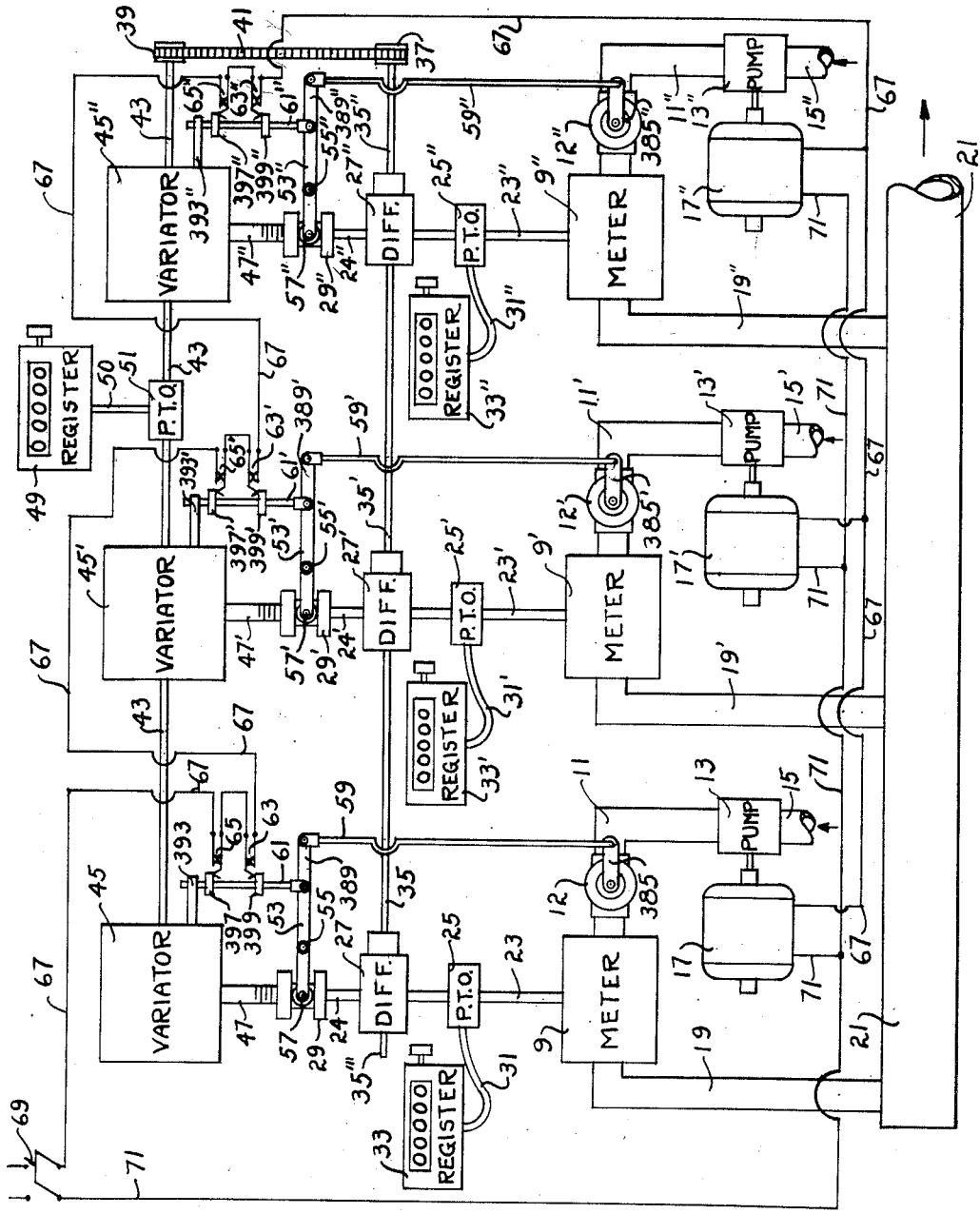
Figure 1 is a schematic diagram of the proportioning system.
Figure 2:
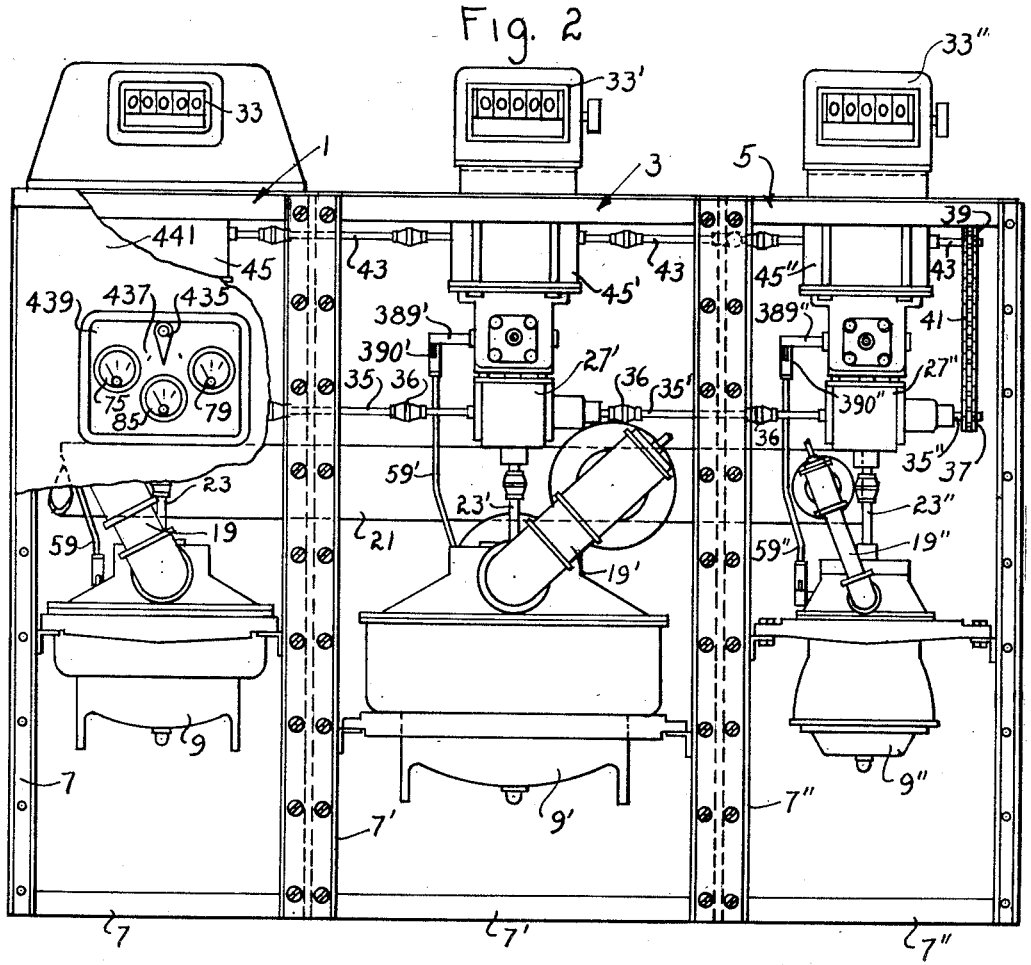
Figure 2 is a front elevation of a battery of metering units connected to constitute a proportioner.

Referring first to Figures 1, 2, 3 and 4, the numerals 1, 3 and 5 represent individual metering units, the frames 7, 7', 7'' of which are bolted together to form an integral proportioner. Each frame has mounted therein a meter 9, 9', 9'' having a pipe 11, 11', 11'' connecting it through a valve 12, 12', 12'' with a pump 13, 13', 13'', the suction pipe 15, 15', 15'' of which is connected with a supply tank or other source of liquid not shown. Motors 17, 17', 17'' are shown for driving the respective pumps. The pumps and motors are not mounted in the frames.

Discharge lines 19, 19', 19'' from the respective meters extend outside of the frame and are connected to a manifold 21.

Each meter has an output shaft 23, 23', 23'' to which is connected in the order named, a power take-off 25, 25', 25'' and a differential unit 27, 27', 27''. The latter is connected by a shaft 24, 24', 24'' to an adjusting nut 29, 29', 29''.

The power take-off drives, through a cable 31, 31', 31'', a register 33, 33', 33'' which indicates the gallons dispensed by its associated meter. It is preferred that the register be of the resettable type so that on each operation, all of the registers may start from zero.

Each differential unit or mechanism imparts to its speed standard increment shaft 35, 35', 35'' the speed of its associated meter. The final increment shaft 35'' is connected by sprockets 37, 39 and chain 41 to the speed standard shaft or 100% shaft 43 which constitutes a speed standard means. The differential mechanisms thus constitute a speed adding means which sums up the individual meter speeds into a single "standard speed." All of the shafts 35 are connected together and all of the shafts 43 are connected together by suitable couplings 36. The shaft 43 drives all of the variators or change speed mechanisms 45, 45', 45'' which in turn drive the adjusting screws or output drives 47, 47', 47''. A totals register 49 which records the sum of the totals on the registers 33, 33', 33'' is driven by a shaft 50 and power take-off 51 from the 100% shaft 43.

A lever 53, 53', 53'' is pivoted at 55, 55', 55'' and each has at one end a yoke 57, 57', 57'' received in the associated adjusting nut while the other end is connected by a link 59, 59', 59'' to the associated valve. Each adjusting nut and adjusting screw constitutes a differential mechanism in which the speeds of the meter and the speed change mechanisms are combined in a subtracting manner so that the direction of movement of the lever 53 or output member is a function of the difference of the two speeds.

A plunger 61, 61', 61'' is connected to each lever and serves to open one or the other of two normally closed, series connected switches 63, 65, 63', 65', 63'', 65''. The sets of series connected switches are connected in series in line 67 which supplies power from main switch 69 to the respective motors and the other line 71 runs direct to the motors from said switch 69.

If desired, each meter unit may be provided with an inlet pressure tube 73'' (Fig. 4) leading from the valve 12'' to a pressure gage 75'' and an outlet pressure tube 77'' leading from the outlet side of the meter to a pressure gage 79''. Also, a thermometer bulb 81'' may be connected in the outlet line 19 and connected through a tube 83'' to a dial 85''.

*Power take-offs*

Figure 18:
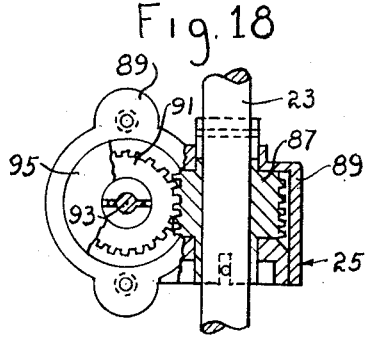
Figure 18 is an elevation, partly in section, showing a power take-off.
Figure 3:
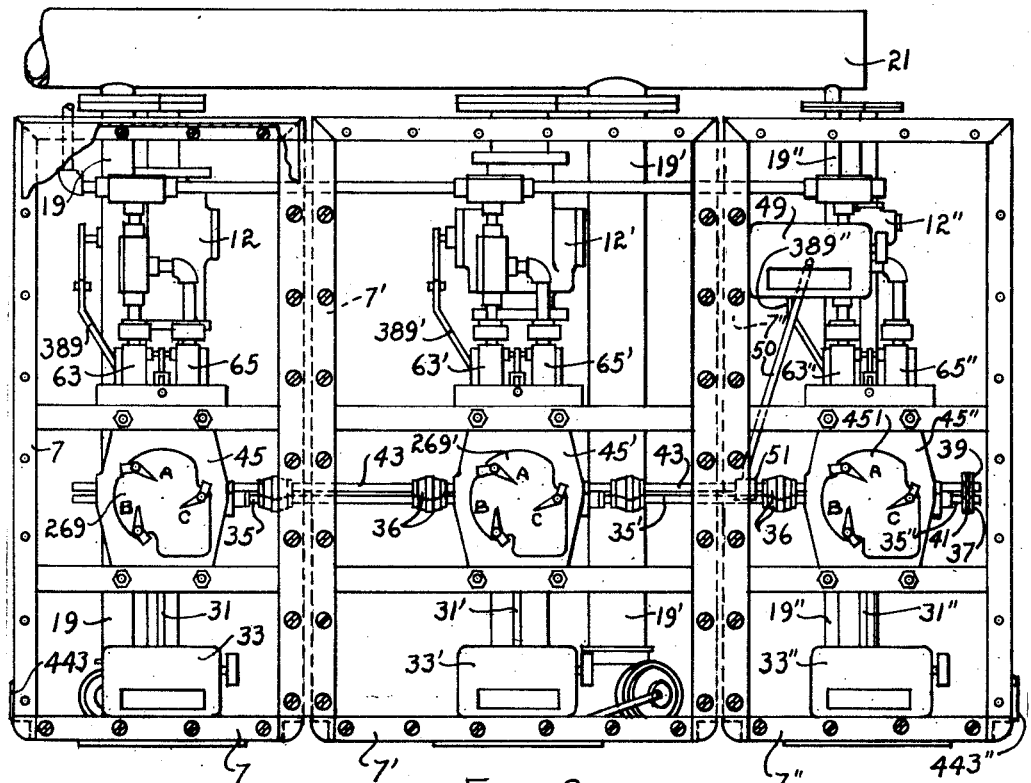
Figure 3 is a plan view of the apparatus of Figure 2.

(Fig. 18)

The power take-off 25 shown in Figure 18 is the same as that used at 50 to drive the register 49 so that only one need be described.

The shaft 23 has pinned to it a worm gear 87 which is rotatably mounted in the case 89. The worm meshes with the worm wheel 91 which is mounted in the case with its axis at 90 degrees to that of the shaft. The core 93 of the flexible cable 31 is keyed in the hub of the wheel while the bell 95 on the cable housing is fixed to the case.

*Differential mechanism*

(Figures 1, 4, 10, 11 and 12)

Referring particularly to Figure 10, the differential mechanism indicated generally by the numerals 27, 27', 27'' comprise a hollow case 97 which is fitted with right and left end caps 99, 101 and a top cap 103. The case has a downwardly projecting boss 105 having an axial bore 107 in which are mounted needle bearings 109 to rotatably support the shaft 23. A bevel gear 111 is mounted on the shaft inside the case.

The end caps 99, 101 are provided with centering bosses 113, 115 which enter bores in the case, with bearing bosses 117, 119 concentric with and of smaller diameter than the first mentioned bosses and additional bearing bosses 121, 123 concentric with and of smaller diameter than the last mentioned bosses. The caps are provided with coaxial bores 125, 127.

Bearings 129 are provided in bore 125 to rotatably support the input speed standard increment shaft 35'''. A miter gear 131 is fixed to the inner end of this shaft with the end of its hub riding on the end of boss 121 as a thrust bearing. A ratchet 133 is fixed to the shaft adjacent a cap plate 135 which is mounted on the end cap 99 and which carries a pawl 137 pivotally mounted at 139 (see Fig. 12). A suitable spring 141 urges the pawl into contact with the ratchet. A similar pawl 138 and ratchet 140 are fixed to the plate 142 and shaft 23 to prevent reverse rotation thereof.

An intermediate shaft 143 is rotatably carried in bearings 145 mounted in bore 127. A miter gear 147 is fixed to the inner end of the shaft with the end of its hub in abutting relation with the end of boss 123 which serves as a thrust bearing therefor. A spur gear 149 is fixed to the other end of the shaft and rides against a bearing plate 151.

A differential cage 153 which is essentially a cylinder has its ends supported by bearings 155, 156 which are disposed on the bosses 117, 119. A shaft 157 is fixed centrally and diametrically in the cage and has a reduced end portion 159 which supports a bearing 161 and a planetary miter pinion 163 which meshes with the pinions 131, 147 described above.

Fixed to the differential case is a bevel gear 165 which meshes with the gear 111 and with a bevel gear 167 which is mounted on a shaft 24 rotatably supported in bearings 169 in the boss 171 of cap 103. The hub of the gear abuts the inner end of the boss while a collar 173 fixed on the shaft abuts the outer end of the boss to properly position the gear. The end of the shaft 24 extending beyond the collar is square in cross-section.

The gears 131, 147 and 163 have the same number of teeth. The gears 111 and 167 have the same number of teeth so that the ratio of shaft 23 to shaft 24 is 1 to 1. The gear 165, however, has 36 teeth so that the cage 153 will rotate once for every two revolutions of gear 111 which has 18 teeth.

A housing 175 fits over cap 101 and is provided with an end cap 177 which is provided with a hub 179. A bore 181 therein is coaxial with shaft 143 and contains bearings 183 which support the output or speed standard increment shaft 35. A gear 185 is fixed to the inner end of the shaft and abuts a bearing plate 187. The ends of shafts 143 and 35 also abut to hold the shaft 35 in place.

Two parallel shafts 189, 191 are mounted in suitable bearings 193, 195 in the caps 101 and 177 respectively. A gear 197 having a long hub is mounted on shaft 189 so that the ends of the hub abut the plates 151, 187 and meshes with gear 149. A second gear 199 is mounted on shaft 191, has a long hub which abuts plates 151, 187 and meshes with gear 185. The two gears 197 and 199 are long enough so that they also mesh with each other as is shown by the dotted line in Fig. 10. The effect of this gearing is merely to reverse the direction of rotation of shaft 35 relative to shaft 143.

*Variator*

(Figures 1, 4, 5, 6, 7, 8, 9 and 17)

Referring first to Figures 5 and 6, the numeral 201 represents the frame of the variator which includes depending ears 203 which are provided with axial bores 205. Bearings 207 are mounted in the bores and rotatably support the speed standard or 100% shaft 43. Endwise travel of the shaft is prevented by the collars 209, one of which abuts the one ear and the other of which abuts a thrust bearing 211 which in turn abut the adjacent ear.

Shaft 43 carries a helical gear 213 which meshes with a helical gear 215 mounted on shaft 217 disposed at right angles adjacent shaft 43. Shaft 217 carries at its upper end a cone gear 219 and has a reduced lower end 221 which is piloted in a bearing 223 mounted in the adjusting screw 225 which is coaxial with the shaft. The upper end of shaft 217 is also piloted in a bearing 227.

The adjusting screw 47 has its lower end threaded at 229 and is provided with an upwardly facing shoulder 231 upon which rests a collar 233. The screw is rotatable on bearings 235 in the boss 237 which forms a part of a cap 239 which is fixed to the frame 201.

A thrust bearing 241 is disposed between the collar and the lower end of the boss.

A collar 243, having a square end-flange 245, is fixed, by means of tangential pins 247, to the upper end of the screw. A thrust bearing 249 is confined between the flange 245 and the inner end of the boss.

The drive to the adjusting screw is through the cone gear 219 and the differential mechanism indicated generally by numeral 251.

Referring particularly to Fig. 7, three shafts 253, 255, 257 which will be referred to hereafter as the units, tens and hundreds shafts respectively are disposed about, parallel to but spaced from shaft 217 and are spaced 120 degrees from each other.

Each of said shafts is supported in suitable bearings in the variator frame. As is shown in Figure 9, shaft 253 is supported in bearings 259 in the frame and in a bushing 261 in the bracket 263 which comprises a top plate 265 and three depending legs 267 which are fixed to the plate and the top of the frame. An indicator plate 269 is mounted on the top plate.

Each of the shafts has a collar such as 271 on shaft 253, which is supported against endwise movement in one direction by a thrust bearing 273 and in the other direction by a collar 275.

A gear 277 is slidably mounted on the upper end of the shaft 253 which is provided with a long keyway 279 to receive the key 281 fixed in the gear. The gear will thus turn the shaft.

A bell crank 283 having one arm 285 bifurcated in a plane perpendicular to the axis of rotation of the crank is rotatably and slidably mounted on the shaft. The bifurcated arm spans the gear 277 as shown in Figure 9 and carries, in mesh with said gear, an idler gear 287 and a take-off gear 289 which may be selectively engaged with the steps of the cone gear, as shown in Figure 7.

A lever 289 having a finger piece 291 is pivoted at 295 on the other arm of the bell crank. This lever carries a pin 297 which is adapted to selectively enter the holes 299 in the associated leg 267. When the pin enters a hole, the take-off gear is positioned on the step of the cone gear which corresponds to the hole.

The lever 289 has an arm 293 which is connected by a link to 301 to an arm 303 on a bifurcated lever 305. A bail 307 is pivotally mounted at each end on the shaft 253, runs the length of the shaft and is confined within the bifurcated part of the lever. The upper end of the bail is extended beyond the shaft and formed as a pointer 309.

A second bail 311 is also pivotally mounted at each end on the shaft 253, spans the bail 307 and has its upper end extended beyond the shaft to form a pointer 313. The bail is spanned by a pair of ears 315 on the bell crank 283.

When the bell crank is positioned with the take-off gear properly meshed with a step of the cone and when the pin 297 is properly entered in a hole 299, the pointers will be aligned. Thus any disalignment of the pointers indicates that the setting is improperly made.

It will be seen that the legs 267 have a helical edge 317 which is in contact with the edge of lever 283 to move the take-off gear 289 toward and away from the cone gear as the lever is moved vertically, to assist in properly positioning the gears, lever and pin 297.

The pointers 309, 313 cooperate with a scale 319 on the plate 269. In the case of shaft 255 this scale is designated the "A" scale, shaft 257 the "B" scale and shaft 253 the "C" scale.

The shaft 253 carries fixed to it a gear 321 which meshes with a gear 323 fixed to the sun gear 325 which rotates freely upon the shaft 217. A planetary carrier 327 rotates freely on the hub of the gears 323, 325 and carries the planetary pinions 329, 331 of which pinions 329 mesh with the gear 325 and pinions 331 mesh with a gear 333 which is fixed to a gear 335.

The carrier 327 has fixed to it a gear 337 which is driven by a gear 339 fixed to the shaft 257 and which is driven by the cone gear through an adjustable mechanism 340 similar to that described in connection with shaft 253. Thus the rotations of both shafts 253 and 257 are compounded in a known manner and the gears 333, 335 are rotated at a speed equal to the sum of the two speeds.

A planetary carrier 341 is freely rotatable on the hub of gears 333, 335 and has fixed to it a gear 343 which is driven by a gear 345 fixed to shaft 255. The latter is driven from the cone gear by a mechanism 347 which is in all respects similar to mechanism 340.

This carrier has rotatably mounted thereon a number of planetary pinions 349, 351, the former of which mesh with gear 335 and the latter of which mesh with a gear 353 fixed to the socket member 355 which is freely rotatable on shaft 217 and which is slotted at 357 to receive the square flange 245 on the adjusting screw 47. The socket and flange form, in effect, an "Oldham" coupling.

In this manner the sum of the rotations of shafts 253 and 257 as represented by gear 335 is compounded in a known manner (as described below) with the rotation of the shaft 255 so that the speed of the adjusting screw is the sum of the speeds of all three shafts 255, 257, 253 multiplied by 1, $\frac{1}{10}$ and $\frac{1}{100}$ respectively.

Control mechanism (Figures 4, 9, 10, 13, 14 and 15)

A housing 359 is connected to the lower part of the variator frame 231 and to the upper part of the differential case 97.

An adjusting nut 29 is threaded at its upper end to receive the threaded end 229 of the adjusting screw 47 and is provided at its lower end with a bushing 363 having a square hole 365 therein to slidably receive the shaft 24. Thus if the speeds of the shaft 24 and screw 47 are different, the nut will move axially up or down on the screw and shaft.

The nut has a central groove 367 which receives the rollers 369 rotatably mounted on the arms of a yoke 57 formed on one end of the adjusting lever 53 which is pivotally mounted on shaft 55 on the housing 359. The shaft 55 is supported in hollow plugs 317 which enter the housing from either side and which serve also to centralize the lever and yoke with respect to the nut.

An arm 389 branches at an angle from the outer end of lever 53 and receives the pin 381 which passes through yoke 383 on the upper end of the valve actuating link 59. The latter is connected to the lever 385 of the valve 12 by means of an adjustable yoke 387.

The outer end of the lever 53 is bifurcated at 379 (Figs. 4 and 15) to pivotally receive the pin 391 on which the switch rod 61 is mounted. The switch rod is slidably guided in a bracket 393 mounted on the variator frame.

A pair of collars 395, 397 are fixed to the rod and actuate respectively the levers 399, 401 of the switches 63, 65.

The valve 12 is preferably a rotary plug valve having diametrically opposed inlet ports 403 which communicate with the inlet opening 405 and diametrically opposed discharge ports 407 which communicate with the outlet 409. The plug 411 is connected to be rotated by lever 385 and has flutes 413 which provide the liquid passages between the inlet and outlet ports, which passages are uniformly and simultaneously throttled as the valve plug is rotated in either direction from the full open position.

Speed indicator (Figures 4, 13, 14 and 15)

A stud 415 is set in a cap 417 which is fastened to the housing 359 and a pair of bosses 419 rotatably support a shaft 421 in parallelism with the stud. A double-armed lever 423, 425 is pivotally mounted on the stud and one arm 423 carries a roller 427 which enters the groove 367 of the adjusting nut. The arm 425 is formed as a gear sector which meshes with a gear 429 on shaft 421.

A socket 431 for a rod 433 is fixed to the outer end of shaft 421 and the rod is connected at the other end to a pointer 435 which cooperates with a scale 437 on the dial panel 439 to indicate the axial position of the nut relative to the screw.

Case

Each of the metering units is provided with a front panel 441 which is supported on the frame 7 and has a window behind which the instruments are mounted on the panel 439.

Each of the end units 7 and 7" is provided with a side panel 443, 443".

Each unit is also supplied with a cover 445 which is pivotally mounted on a hinge 447 at the rear of the frame. The cover has a window 449 which is disposed adjacent the register 33 so that the latter may be read.

Variations

It is obvious that the three metering units shown are only representative of different types of units. These units may be combined in any reasonable number and in any order. Also, the units may be of any type or combination of types.

Thus one proportioner might be made of four metering units using large meters such as shown in the unit indicated by numeral 3 while another proportioner might comprise three of these units with one of the units indicated by numeral 5.

Thus great flexibility is attained in the manufacture of proportioners from the individual metering units.

Figure 17:
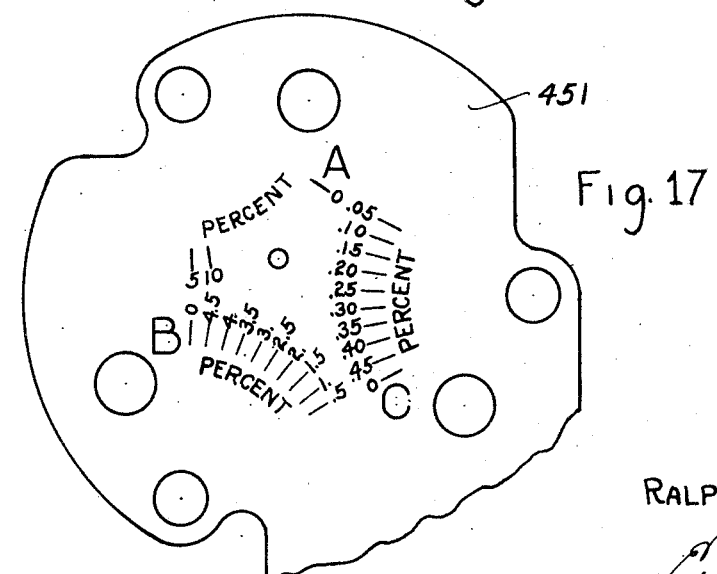
Figure 17 is a plan view of a percentage setting dial for percentages of from .05% to 5% in increments of .05%.
Figure 13:
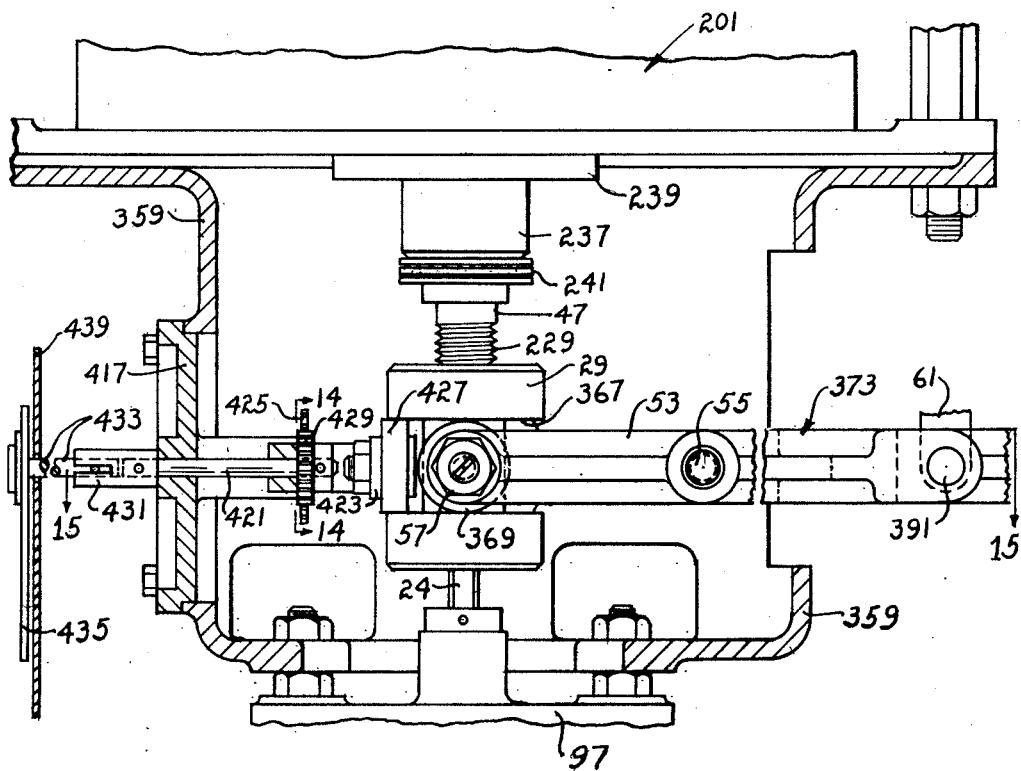
Figure 13 is an elevation showing the valve adjusting and shut-off mechanisms and the shut-off indicator.
Figure 14:
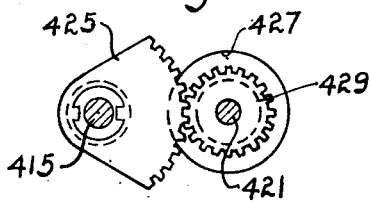
Figure 14 is a sectional view taken substantially on line 14—14 of Figure 13 showing the gearing for the shut-off indicator.
Figure 15:
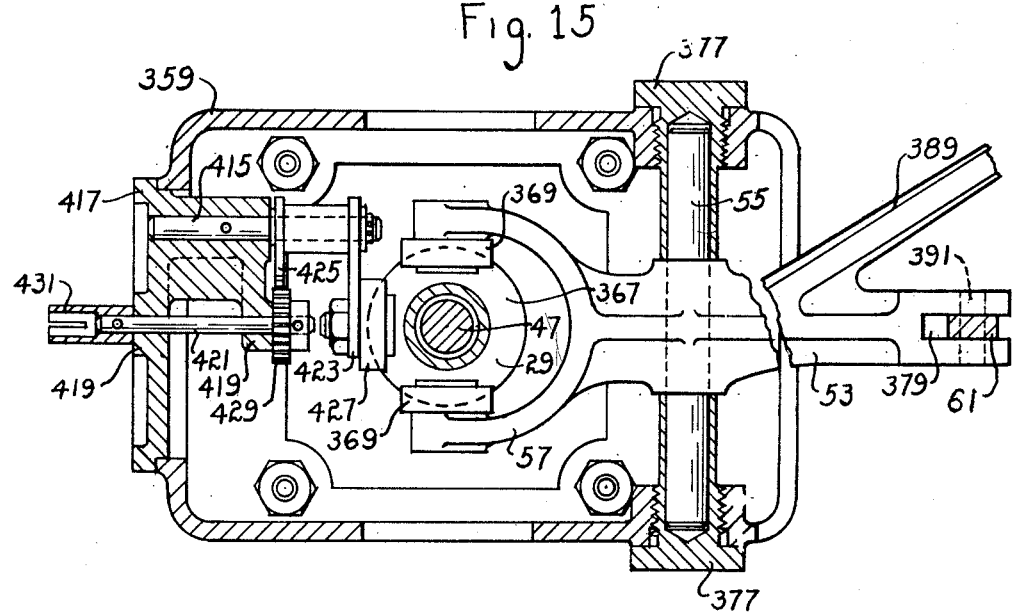
Figure 15 is a sectional view of the mechanism of Figure 13 taken substantially on line 15—15 thereof.
Figure 16:
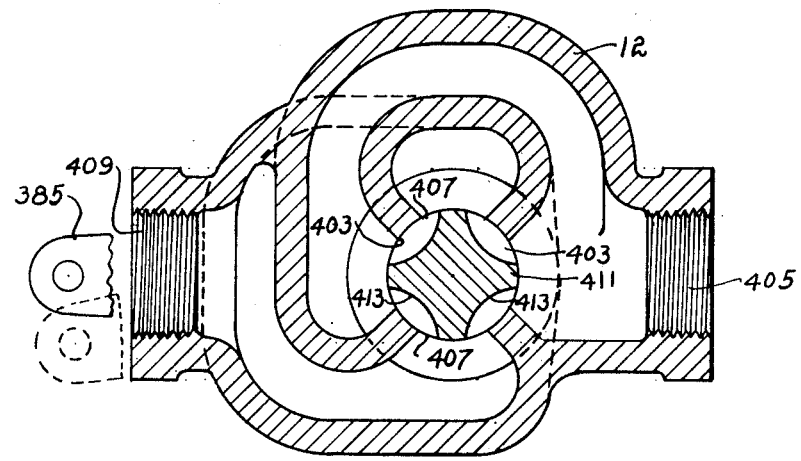
Figure 16 is a sectional view of the control valve.

Operation (Figures 1, 8 and 17)

Let us assume that the metering units 1 and 3 have a one to one reduction in the variators and that unit 5 has a ten to one reduction and that each of the meters 9, 9', 9" are so geared that their respective shafts 23, 23', 23" will rotate one revolution for each gallon of liquid put through the meter. The variators 45 and 45' will have indicator plates 269 (Fig. 8) while variator 45" will have a plate 451 (Fig. 17).

Let us assume that the proportion of the liquid to be supplied by unit 1 is 30%, that to be supplied by unit 3 is 60% and that by unit 4 is 10%, totaling 100%.

On the first unit the gear changing mechanism 347 is set with its pointer indicating the "0" mark on the "A" scale. The mechanism 340 is operated to set its pointer on the "30" mark on the "B" scale. The mechanism 283 is operated to set its pointer on the "C" scale at "0." In the case of the "A" and "C" scale mechanisms, their take-off gears are held out of contact with the cone gear and their gear trains are locked against rotation by fixed stops (not shown). The first unit is thus set to deliver 30%.

The second unit is to deliver 60% so that its mechanism 347' is operated to set the pointer to indicate "50" on the "A" scale; its mechanism 340' is operated to set its pointer at "10" on the "B" scale; and mechanism 283' is operated to set its pointer at the "0" position on the "C" scale in which case it is locked inactive.

The third unit is then preset by operating mechanism 347" to set the pointer at "10" on the "A" scale. The other pointers are set at "0" on the "B" and "C" scales so that their respective trains are locked and out of engagement with the cone gear.

The pumps are then started and the various liquids are forced through the meters under pressure. Assuming that the total rate of delivery from the proportioner is 100 G. P. M., the shafts 23, 23', 23" are rotated in the same direction (clockwise as viewed in Fig. 3) but at the speeds of 30, 60 and 10 R. P. M. respectively. These rotations are transmitted, reversed in direction but unchanged in speeds, to the shafts 24, 24', 24" by means of the gears 111(18T), 165(36T) and 167(18T). The cage 153 is thus driven at one-half the speed of shafts 23, 24.

In the unit 1, the shaft 35''' is held against backward rotation. The cage 153 rotates counterclockwise (viewed from the left, Fig. 10) and carries gear 147 in the same direction but at twice the speed of the cage so that shaft 143 and gear 149 are rotating at the same speed as shafts 23, 24 but in a clockwise direction viewed from the right of Fig. 10. This rotation is reversed by gears 197, 199, 185 so that shaft 35 will rotate one revolution per minute counterclockwise.

The second and third differentials 27' and 27" will add the revolutions of the meters 9' and 9" to that of meter 9 so that the shaft 35" will be driven at a speed equal to the sum of the speeds of shafts 23, 23', 23". Shaft 43 is driven at the speed of shaft 35" by chain gearing 37, 39 and 41, that is 30 plus 60 plus 10 or 100 R. P. M.

Referring now to the variators, the gearing from the shaft 43 to shaft 217 (gears 213 and 215) in each of the variators 45, 45' is a one to one ratio while in 45" it is a ten to one reduction.

In each of the variators the gearing from any step of the cone 219 to the adjusting screw 47, through the shaft 255, is $\frac{1}{16}$ times the number of teeth on the particular step of the cone which is engaged. The cone steps have 8, 16, 24, 32, 40, 48, 56, 64 and 72 teeth respectively.

The gearing from any step of the cone through shaft 257 to the adjusting screw is $\frac{1}{16}$ times $\frac{1}{10}$ times the number of teeth in the step engaged while that through shaft 253 is $\frac{1}{16}$ times $\frac{1}{100}$ times the number of teeth in the step engaged by its take-off gear. Thus the A, B and C scales on variators 45, 45' indicate in 50%, 5% and $\frac{5}{10}$% steps respectively while the scales of the variator 45" indicate in 5%, $\frac{5}{10}$% and $\frac{5}{100}$% steps because of the added ten to one reduction between shafts 43 and 217.

The principles of gearing disclosed in connection with the variators are old and well known in the art and are shown in the patents to O. C. Schroeder No. 1,709,233, issued April 16, 1929, and W. M. Carroll No. 2,229,370, issued January 21, 1941, and others, so that it is not believed necessary to trace the gearing in detail.

Proceeding with the assumed 30%, 60%, 10% proportion set up as described above and the assumption that the proportioner is delivering 100 G. P. M., it will be seen that at 1 revolution per gallon on the meters, shafts 23, 24 and 35 will be rotating at 30 R. P. M.; shafts 23', 24' will be rotating at 60 R. P. M. while 35' will be rotating at 30 plus 60 or 90 R. P. M.; and shaft 23', 24' will be rotating at 10 R. P. M. while shafts 35" and 43 will be rotating at 30 plus 60 plus 10 or 100 R. P. M. The shafts 217, 217' of the variators 45, 45' will be running at 100 R. P. M. while 217" of 45" will be operating at 10 R. P. M.

On variator 45 the shaft 257 is operated with the take-off gear on the 4th from the bottom or 48-tooth step on the cone. The adjusting screw will therefore be rotated at a speed of $$100 \times 48 \times \tfrac{1}{16} \times \tfrac{1}{10} = 30 \text{ R. P. M.}$$

in the same direction as nut 29. Thus the speeds of the adjusting nut 29 and adjusting screw 47 match and the nut will remain stationary, axially.

On the variator 45', the shaft 255 is operated with the take-off gear on top or 8-tooth step so that the speed of the adjusting screw as the result of this train will be $100 \times 8 \times \tfrac{1}{16} \times 1 = 50$ R. P. M.

The shaft 257 is also operative, however, and its take-off gear is in mesh with the second gear from the top so that the speed of the adjusting screw as the result of this train is $$100 \times 16 \times \tfrac{1}{16} \times \tfrac{1}{10} = 10 \text{ R. P. M.}$$

The sum of the two gear trains is therefore 50 plus 10 or 60 R. P. M. which matches the speed of shaft 24' and the adjusting nut 29' so that the latter will not move axially.

Similarly, on the variator 45" the shaft 255 is set on the second step from the top so that the speed of its adjusting screw will be $$10 \times 16 \times \tfrac{1}{16} \times 1 = 10 \text{ R. P. M.}$$

so that the speed of the adjusting nut 29" is matched and the nut will not be shifted axially.

In the formula used above, in each case, to find the speed of the adjusting screw, the first factor is the speed of the shaft 217; the second factor, the number of teeth on the step of the cone which is engaged by the take-off gear in the particular train in question; the third factor is the gearing constant; and the last factor is the train constant which is 1 for the A scale, $\tfrac{1}{10}$ for the B scale and $\tfrac{1}{100}$ for the C scale which correspond with the shafts 255, 257 and 253 respectively. Thus as long as the rotational speeds of the adjusting nuts and shafts are the same, the adjusting nuts will remain in one axial position.

Assume now, that the meter 9 fails to maintain its speed. The shaft 43 will also lose speed but not as much as the meter. Assume that the meter running at 30 R. P. M. lost 3 R. P. M.; the screw would run at $93 \times 48 \times \tfrac{1}{16} \times \tfrac{1}{10} = 27.9$ R. P. M. There would therefore be a tendency for the nut to run down on the screw which has a right-hand thread. However, at the same time the screws of the meters 9' and 9" would be running at a reduced rate so that the nuts of these meters, running faster than the screws, would tend to climb them. Thus the lever and linkage of each nut will operate the associated valve to open the valve in the case of meter 9 and to close the valves in the case of meters 9' and 9" so that the tendency in all three meters is to maintain the proportion constant. Since the changes occur simultaneously and promptly as soon as the change occurs in the speed of any meter, the proportion is maintained substantially constant at an output which can be met by all of the meters. The output is thus determined by the speed of the starved meter.

Correction in the opposite direction is also attained if one of the meters speeds up for any reason. However, since at least one of the valves 12, 12', 12" are usually set near the full open position, it is not possible to compensate for any marked increase in flow of any one meter.

In any case, if the relative speeds of any nut and its associated screw are not brought into equilibrium, the nut will continue to move in one direction or the other until it, through the rod 61, operates one or the other of the switches 397, 399 to stop all of the pumps.

The pointers 439 indicate the positions of the nuts relative to the screws and maintain a constant position as long as the proportion is being held. However, if one of the nuts moves to either switch actuating position, the pointer will follow and will indicate which metering unit or units are responsible for the shutdown.

It is then necessary to correct the condition responsible for the stop, and before the proportioner can again be started, it is necessary to manually rotate the adjusting screw of this metering unit to centralize the nut on the screw. This is done by disconnecting one of the take-off gears 289 and rotating its shaft in the proper direction.

Should it be desired to cut out one or more of the metering units, all that is necessary is that all three of the pointers of the variators on such unit or units be set to zero on the A, B and C scales. These gear trains are thus all disconnected from the cone gear which revolves freely. The remaining meters must then be set so that the sum of their scale readings is 100% and the proportioner will then be usable on these remaining liquids and will proportion them in accordance with their settings.

It is also possible to operate any one of the metering units by itself to dispense a single liquid.

In this case, the indicators of all the variators except that to be used are set to zero. The A scale of the unit to be used is then set to 100% if it is a unit represented by numerals 1 or 3 or to 10 in the case of a number 5 unit, which has a 10 to 1 reduction between shafts 43 and 217, while the B and C scale pointers are set at zero.

In the first case, assuming that the meter is capable of delivering 50 G. P. M., the shafts 23, 24, 35, 35'' and 43 will all rotate 50 R. P. M. With the pointer set at 100 on the A scale the gearing will produce the following adjusting screw speed: $50 \times 16 \times \frac{1}{16} \times 1 = 50$ R. P. M. Thus the screw and nut will operate at the same speed and in the same direction so that the meter will continue to operate as long as liquid is supplied to it regardless of the rate. If the meter slows or speeds the shaft 43 must follow and there will be no relative movement of the nut and screw.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a fluid proportioner comprising at least two fluid flow lines, means for supplying fluid under pressure to said flow lines, a fluid meter in each line, the combination of a differential mechanism having two drives and an output member, means connecting a meter to one of said drives, speed adding means connected to be driven by said meters, a speed standard means connected to be driven by said adding means at a speed equal to the sum of said meter speeds, speed change means connected to be driven by said standard means and having an output shaft connected to actuate the other drive of said differential mechanism in a direction to actuate said output member in accordance with the difference in the speeds of said drives, and means connected with said output member for adjusting the speed of the associated meter.

2. In a fluid proportioner comprising at least two fluid flow lines, means for supplying fluid under pressure to said flow lines, a fluid meter in each line, the combination of a differential mechanism for each meter, said mechanism having two drives and an output member, means connecting the associated meter to one of said drives, speed adding means connected to be driven by said meters, a speed standard means connected to be driven by said adding means at a speed equal to the sum of said meter speeds, speed change means, one for each meter, connected to be driven by said standard means and having an output shaft connected to actuate the other drive of the associated differential mechanism in a direction to actuate said output member in accordance with the difference in the speeds of said drives, and means connected with said output member for adjusting the speed of the associated meter.

3. In a fluid proportioner comprising at least two fluid flow lines, means for supplying fluid under pressure to said flow lines, a fluid meter in each line, the combination of a differential mechanism having two drives and an output member, means connecting a meter to one of said drives, speed adding means connected to be driven by said meters, a speed standard means connected to be driven by said adding means at a speed equal to the sum of said meter speeds, speed change means, one for each meter, connected to be driven by said standard means and having an output shaft connected to actuate the other drive of said associated differential mechanism in a direction to actuate said output member in accordance with the difference in the speeds of said drives, said speed change means being settable to produce speeds of said other drive which are direct percentages of the speed of said speed standard means, and means connected with said output member for adjusting the speed of the associated meter.

4. In a fluid proportioner comprising at least two fluid flow lines, means for supplying fluid under pressure to said flow lines, a fluid meter in each line, the combination of an adjusting nut connected to be driven by each meter, speed adding means connected to be driven by said meters, speed standard means connected to be driven by said adding means at a speed equal to the sum of the speeds of said meters, an adjusting screw in engagement with each nut, speed change means connected to drive said screws and connected to be driven by said speed standard means, and means connected for operation by each nut for controlling the speed of the associated meter.

5. In a fluid proportioner comprising at least two fluid flow lines, means for supplying fluid under pressure to said flow lines, a fluid meter in each line, the combination of a differential mechanism associated with each meter and having two drives and an output member, means connecting said associated meter to one of said drives, speed adding means connected to be driven by said meters, a speed standard means connected to be driven by said adding means at a speed equal to the sum of said meter speeds, means connected to be driven by said standard means for driving the other drive of said differential mechanism at a speed equivalent to the product of the sum of said meter speeds and the percentage of the total output of the proportioner which is to be delivered by the associated meter and in a direction to actuate said output member in accordance with the difference in said speeds, and means connected with said output member for adjusting the speed of the associated meter.

6. In a fluid proportioner comprising at least two fluid flow lines, means for supplying fluid under pressure to said flow lines, a fluid meter in each line, the combination of a differential mechanism having first and second drives and an output member, a change speed mechanism having a speed standard shaft, an output shaft and adjustable means for selectively varying the speed of said output shaft relative to said standard shaft, means for connecting said output shaft to drive said second drive in a direction to impart to said output member a movement proportional to the difference in speeds of said output shaft and the meter, means operable by said output member for controlling the speed of the meter, additional differential means comprising means driven by said meters, and means for adding the speeds of all of said meters and transmitting said sum to said speed standard shaft.

7. In a fluid proportioner comprising at least two fluid flow lines, means for supplying fluid under pressure to said flow lines, a fluid meter in each line, the combination of means for continuously adding the speeds of all of said meters to produce a standard speed, a change speed mechanism for each meter connected to be driven by said adding means at said standard speed and having an output drive, means for altering the speed of each meter, and means responsive to the difference in speeds of a meter and the associated output drive for actuating the corresponding speed altering means.

8. In a fluid proportioner comprising at least two fluid flow lines, means for supplying fluid under pressure to said flow lines, a fluid meter in each line, the combination of means for continuously adding the speeds of all of said meters to produce a standard speed, a change speed mechanism connected to be driven by said adding means at said standard speed and having an output drive, meter speed altering means, and means responsive to the difference in speeds of a meter and the output drive for actuating said speed altering means, said responsive means being connected to move said speed altering means in a direction to equalize the speeds of the meter and change speed mechanism.

9. In a fluid proportioner comprising at least two fluid flow lines, means for supplying fluid under pressure to said flow lines, a fluid meter in each line, the combination of means for continuously adding the speeds of all of said meters to produce a standard speed, a change speed mechanism connected to be driven by said adding means at said standard speed and having an output drive, means for altering the speed of each meter, and means associated with each meter responsive to the difference in speeds of said meter and the output drive for actuating said speed altering means.

10. In a fluid proportioner comprising at least two fluid flow lines, means for supplying fluid under pressure to said flow lines, a fluid meter in each line, the combination of means for continuously adding the speeds of all of said meters to produce a standard speed, a change speed mechanism associated with each meter connected to be driven by said adding means at said standard speed and having an output drive, means for altering the speed of each meter, and means associated with each meter and responsive to the difference in speeds of said meter and the output drive for actuating said speed altering means.

11. In a fluid proportioner comprising at least two fluid flow lines, means for supplying fluid under pressure to said flow lines, a fluid meter in each line, the combination of means for continuously adding the speeds of all of said meters to produce a standard speed, a change speed mechanism associated with each meter connected to be driven by said adding means at said standard speed and having an output drive, means for altering the speed of each meter, and means associated with each meter and responsive to the difference in speeds of said meter and the output drive of the change speed mechanism for actuating said speed altering means, said responsive means being connected to move said speed altering means in a direction to equalize the speeds of said meter and the output drive.

12. In a fluid proportioner comprising at least two fluid flow lines, means for supplying fluid under pressure to said flow lines, a fluid meter in each line, the combination of means for continuously adding the speeds of all of said meters to produce a standard speed, a change speed mechanism for each meter connected to be driven by said adding means at said standard speed and having an output drive, means for altering the speed of each meter, means responsive to the difference in speeds of a meter and the associated output drive for actuating the corresponding speed altering means, and a register connected to be driven by said adding means at said standard speed.

13. In a fluid proportioner comprising at least two fluid flow lines, means for supplying fluid under pressure to said flow lines, a fluid meter in each line, the combination of means for continuously adding the speeds of all of said meters to produce a standard speed, a change speed mechanism for each meter connected to be driven by said adding means at said standard speed and having an output drive, means for altering the speed of each meter, means responsive to the difference in speeds of a meter and the associated output drive for actuating the corresponding speed altering means, and a register connected to be driven by each meter.

14. In a fluid proportioner comprising at least two fluid flow lines, means for supplying fluid under pressure to said flow lines, a fluid meter in each line, the combination of means for continuously adding the speeds of all of said meters to produce a standard speed, a change speed mechanism for each meter connected to be driven by said adding means at said standard speed and having an output drive, means for altering the speed of each meter, means responsive to the difference in speeds of a meter and the associated output drive for actuating the corresponding speed altering means, a register connected to be driven by each meter, and a register connected to be driven by said adding means at said standard speed.

15. In a fluid proportioner comprising at least two fluid flow lines, means for supplying fluid under pressure to said flow lines, a fluid meter in each line, the combination of means for continuously adding the speeds of all of said meters to produce a standard speed, a change speed mechanism for each meter connected to be driven by said adding means at said standard speed and having an output drive, means for altering the speed of each meter, means responsive to the difference in speeds of a meter and the associated output drive for actuating the corresponding speed altering means, and indicator means connected for operation by said actuating means to indicate the position thereof.

16. In a fluid proportioner comprising at least two fluid flow lines, means for supplying fluid under pressure to said flow lines, a fluid meter in each line, the combination of means for continuously adding the speeds of all of said meters to produce a standard speed, a change speed mechanism for each meter connected to be driven by said adding means at said standard speed and having an output drive, means for altering the speed of each meter, means responsive to the difference in speeds of a meter and the associated output drive for actuating the corresponding speed altering means, said actuating means being operable through a predetermined path, and means disposed at a predetermined position in the path of said actuating means for operation thereby for disabling said proportioner upon operation of said actuating means to said position.

17. A metering unit for a proportioner comprising a frame, fluid inlet and outlet lines mounted in said frame, a valve in one of said lines, a meter connected in said lines, a speed change mechanism mounted in said frame, a differential mechanism connected to be driven by both said meter and said speed change mechanism and adapted to be moved in accordance with the difference in the speeds of said drives and connected to impart a corresponding motion to said valve, a second differential mechanism connected to be driven by said meter, a second drive shaft for said second mechanism extending to one side of said frame and an output shaft from said second mechanism extending to the other side of said frame, said second mechanism serving to add the speeds of said second drive shaft and said meter and to drive said output shaft at the sum of said speeds, and a speed standard shaft connected to drive said speed change mechanism and extending from one side of said frame to the other.

18. A proportioner comprising a number of metering units mounted in side by side relation, each metering unit comprising a frame, fluid inlet and outlet lines mounted in said frame, a valve in one of said lines, a meter connected in said lines, a speed change mechanism mounted in said frame, a differential mechanism connected to be driven by both said meter and said speed change mechanism and connected to impart the difference in said drives to said valve, a second differential mechanism connected to be driven by said meter, a second drive shaft for said second mechanism extending to one side of said frame and an output shaft from said second mechanism extending to the other side of said frame, said second mechanism serving to add the speeds of said second drive shaft and said meter and to drive said output shaft at the sum of said speeds, a speed standard shaft connected to drive said speed change mechanism and extending from one side of said frame to the other, said speed standard shafts of all of said units being substantially coaxial and connected in series and said second drive shafts and output shafts of all of said units being substantially coaxial and connected in series, and means on the last unit for connecting the output shaft thereof to drive the speed standard shaft thereof.

19. A metering unit in accordance with claim 17 having a register mounted on the frame, means connecting the register to be driven by the meter and a cover for the frame having a window therein for displaying the register.

20. A metering unit in accordance with claim 17 having a register mounted on the frame, means connecting the register to be driven by the meter, a cover for the frame having a window therein for displaying the register and a front housing panel for said frame.

21. A proportioner in accordance with claim 18 having a cover hingedly attached to the frame of each unit, a front housing panel connected to the front of each unit and an end housing panel mounted on the exposed side of each end unit.

22. A proportioner in accordance with claim 18 having a register mounted at the top of the frame of each unit, a cover hingedly mounted on the frame at the rear of each unit, and each cover having a window adjacent the register to display it.

23. A proportioner in accordance with claim 18, each unit having indicating means mounted on the frame adjacent the front thereof and having a panel mounted on the front of the frame provided with window means disposed to display said indicating means.

24. In a fluid proportioner comprising at least two fluid flow lines, means for supplying fluid under pressure to said flow lines, a fluid meter in each line, the combination of means for continuously adding the speeds of all of said meters to produce a standard speed, a change speed mechanism for each meter connected to be driven by said adding means at said standard speed, means for altering the speed of each meter, means responsive to the difference in speeds of a meter and its associated change speed mechanism for actuating the corresponding speed altering means, and means preventing the reversal of operation of said meters and speed adding means.

RALPH B. PRESSLER.

References Cited in the file of this patent

UNITED STATES PATENTS

| Number | Name | Date |
|---|---|---|
| 2,024,478 | Short | Dec. 17, 1935 |
| 2,024,479 | Short | Dec. 17, 1935 |